Nov. 18, 1924.  1,516,016
E. KALLENBACH
SETTLING TABLE
Filed Nov. 26, 1921  2 Sheets-Sheet 1
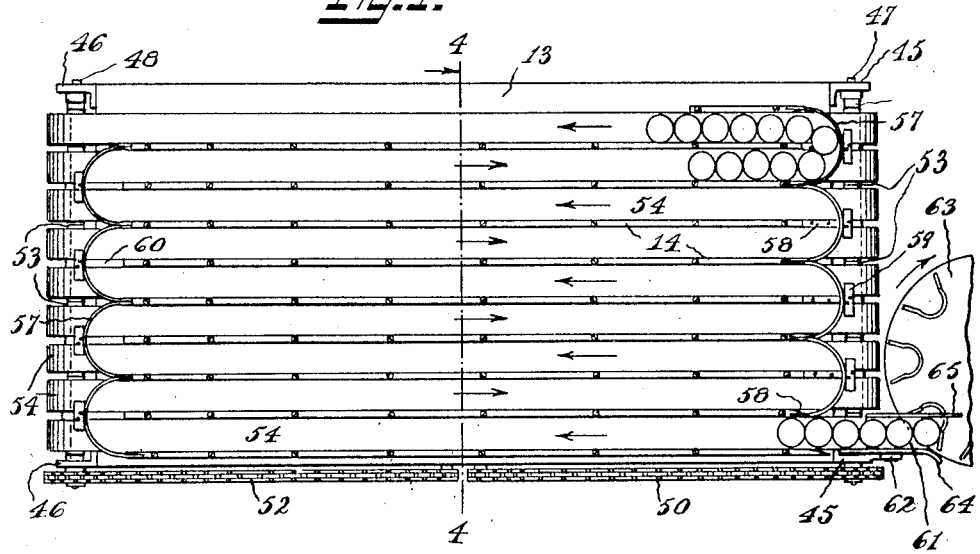
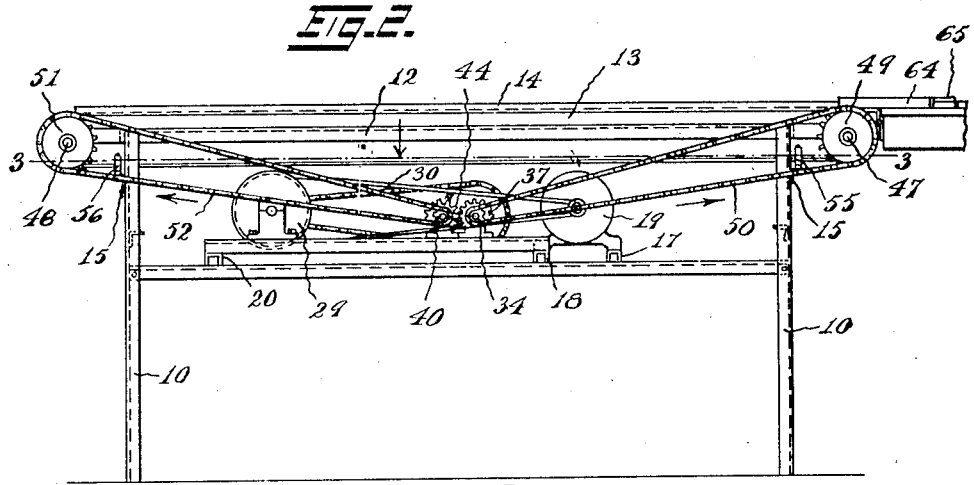
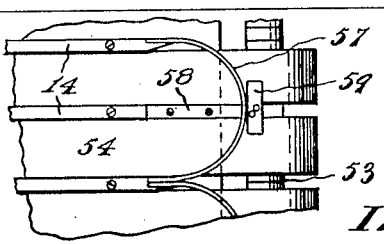
Witnesses:
L. C. Badeau
H. O. Penney
Inventor:
Edward Kallenbach,
By his att'y, Nov. 18, 1924.  1,516,016
E. KALLENBACH
SETTLING TABLE
Filed Nov. 26, 1921    2 Sheets-Sheet 2
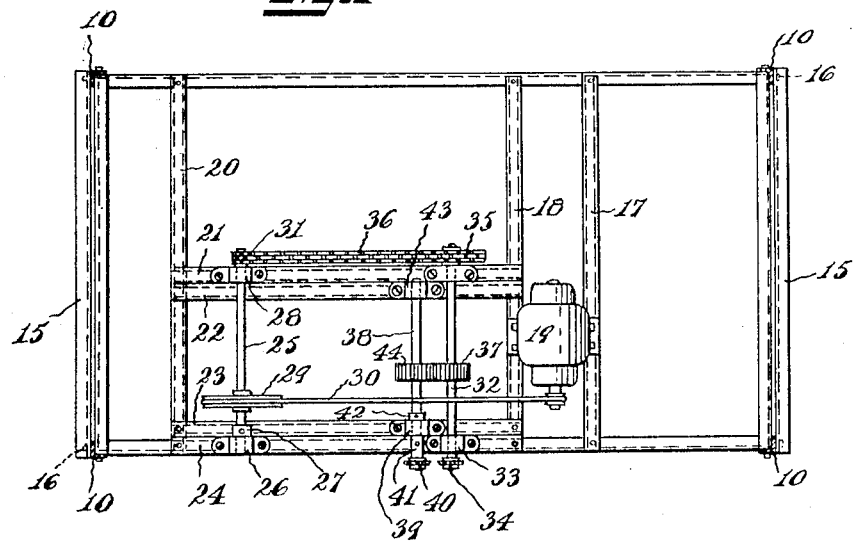
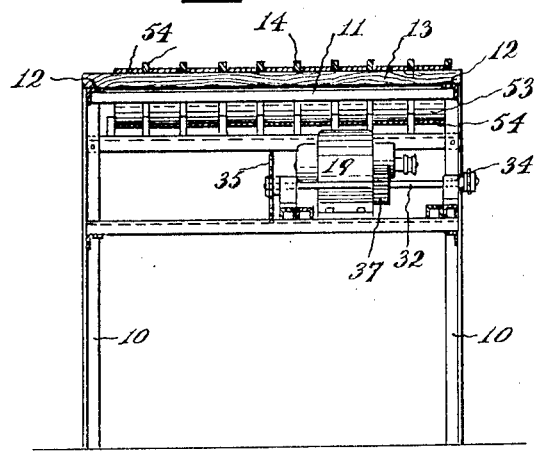
Witnesses:
L. C. Badeau
R. D. Penney
Inventor:
Edward Kallenbach,
By his Att'y, F. H. Richards Patented Nov. 18, 1924.

1,516,016

UNITED STATES PATENT OFFICE.

EDWARD KALLENBACH, OF NEW YORK, N. Y.

SETTLING TABLE.

Application filed November 26, 1921. Serial No. 517,910.

*To all whom it may concern:*

Be it known that I, EDWARD KALLENBACH, a citizen of the United States, residing in New York city, in the county of New York and State of New York, have invented certain new and useful Improvements in Settling Tables, of which the following is a specification.

The present invention relates to conveyor apparatus or conveyor tables, and particularly to those used in the settling or cooling of mixtures, such as salves, emollients and the like, after the same have been placed in containers and prior to the capping or closing of the containers, and one object is to provide a settling apparatus or settling table by which the settling or cooling of mixtures in recently filled containers may be effectually accomplished during movement of the containers by the settling apparatus or settling table from the place of filling to the place of capping or closing the containers.

Another object is to provide an apparatus or table of compact form and arranged for economy of space adapted for moving onward containers or other articles from a point of reception to a point of withdrawal, the onward movement being for a short distance in one direction and then for a short distance in the opposite direction until, due to the combined movements for short distances, the containers or other articles have been moved onward over a long extent of space and for a period of time, during which movement and time desired changes in the contents of the containers or condition of the other articles are permitted to take place.

Another object is to provide a settling apparatus or settling table comprising a plurality of adjacently arranged reversely moving surfaces, each of which is short in length, for continuously moving onward containers or other articles from a point of reception to a point of withdrawal, the onward movement being for a short distance in one direction and then for a short distance in the opposite direction until, due to the combined movements for short distances, the containers or other articles have been moved onward over long extent of space and for a period of time.

Another object is to provide a settling apparatus or settling table of the character described which takes up little space, has no complicated parts, is easily operated and is cheap to manufacture.

Another object is to provide a process for cooling or settling mixtures by continuously moving onward for short distances in alternately reverse directions containers having the mixtures therein until, due to the combined short movements, the containers have been moved onward over a lengthy space and time is afforded for cooling or settling the contents thereof.

I accomplish these objects, and others of a like or kindred nature, by the invention one embodiment of which by way of example is described in the following specification and shown in the accompanying drawings in which Figure 1, is a plan view.

Figure 2, is a side elevation.

Fig. 3, is a sectional plan view on the line 3—3 of Fig. 2.

Figure 4, is a sectional view in elevation on the line 4—4 of Fig. 1, looking in the direction of the section line arrow, the sprocket wheel and sprocket chain shown in Fig. 1 being omitted for convenience of illustration.

Figure 5, is a fragmentary detail view on an enlarged scale of parts of the invention.

Similar reference characters denote similar parts throughout the several views.

The invention comprises a frame having the legs 10, end pieces 11, and side pieces or strips 12, the frame preferably being of angle metal.

The bed 13, which preferably is of wood, is secured in a suitable manner to the top of this frame. The bed 13 is provided with a plurality of parallel longitudinal ribs or guide strips 14, preferably of wood, suitably secured thereto as by the screws shown, these ribs or strips being equally spaced apart.

The exterior end pieces 15 are suitably secured, as by the rivets 16, to the legs 10 at each end of the frame in a lower plane than the end pieces 11, the purpose of the end pieces 15 being later stated.

The interior parallel cross-pieces 17 and 18, are arranged in a lower plane than the exterior end pieces 15, and are suitably secured, as by the rivets or bolts, to the side-pieces or strips 12, the purpose of the cross-pieces 17 and 18 being to support a suitable motor such as 19, the cross-piece 18 also providing means for supporting the driving mechanism of the settling table at one end of the mechanism, the interior cross-piece 20, suitably secured at its ends to the side-pieces or strips 12, supporting such mechanism at its opposite end.

The adjacently parallel longitudinal supports 21 and 22 are suitably secured at their respective ends to the cross-pieces 18 and 20, the longitudinal supports 21 and 22 being positioned near the middle longitudinal line of the frame.

The adjacently arranged parallel longitudinal supports 23 and 24 are positioned adjacently to one of the side pieces or strips 12, the longitudinal support 23 being suitably secured at its ends to the cross-pieces 18 and 20 and the longitudinal support 24 being suitably secured at its ends to one of the side pieces or strips 12.

The drive shaft 25 is journalled at its outer end in the strap 26 suitably secured to the longitudinal support 24, outward movement of the shaft 25 being prevented by a collar 27 secured to the shaft 25 and abutting the strap 26. The shaft 25 is journalled at its inner end in the strap 28 suitably secured to the longitudinal support 21.

The drive wheel 29 is keyed on the shaft 25 and is operatively connected, as by the belt 30, with the motor 19 for rotation of the drive wheel and drive shaft.

But I do not restrict myself to this arrangement for rotating the drive shaft, as the drive shaft may have its end extended in manner, not shown, beyond the frame of the settling table, and power steam or electric, not shown, may be thus or otherwise directly applied to the drive shaft for rotation thereof.

The drive shaft 25 is provided at its inner end, inwardly from the strap 28, with the sprocket 31.

The counter-shaft 32 is journalled at its outer end in the strap 33 suitably secured to one of the side pieces or strips 12 and is provided at its outer end with the sprocket 34. The counter-shaft 32 is provided on its inner end with a sprocket wheel 35 which is operatively connected to the sprocket 31 by the sprocket chain 36.

The counter-shaft 32 has keyed thereon the gear wheel 37.

The secondary shaft 38 is journalled at its outer end in the strap 39 which is suitably secured to the longitudinal support 23. The shaft 38 is provided at its outer end with the sprocket 40 and has fixed thereon the collar 41 which abuts the strap 39 on the outer side of the strap and prevents inward movement of the shaft 38, outward movement of said shaft being prevented by the collar 42 fixed thereon and abutting the inner side of the strap 39.

The shaft 38 is journalled at its inner end in the strap 43, which is suitably secured to the longitudinal support 22.

The shaft 38 has keyed thereon the gear wheel 44 which meshes with the gear wheel 37 for rotation in reverse direction to the rotation of the gear wheel 37.

The bed 13 is provided at each of its ends, at the edges of the bed, with the outwardly extending brackets 45 and 46, there being a pair of such brackets at each end of the bed.

The shaft 47 is journalled at each of its ends in the brackets 45 and the shaft 48 is journalled at each of its ends in the brackets 46.

The shaft 47 is provided at one end with the sprocket wheel 49, keyed on the shaft for rotation therewith, the sprocket wheel 49 being operatively connected to the sprocket 34 by the sprocket chain 50; the shaft 48 is provided at the end thereof opposite to the sprocket wheel 49 with a sprocket wheel 51 keyed on this shaft for rotation therewith, the sprocket wheel 51 being operatively connected to the sprocket 40 by the sprocket chain 52.

A series of similar pulleys such as 53, Fig. 3, is arranged on each of the shafts 47 and 48, in the present instance there being nine such pulleys in each series, the pulleys being spaced apart by the contact of the pulley hubs, or by other suitable spacing means, each pulley being arranged on its respective shaft so that its outer sides will be within the side limits of the lines of adjacent parallel longitudinal ribs or guide strips 14 of the bed 13, if the lines of these ribs were extended to include the pulleys within the side limits thereof. To prevent longitudinal movement of the shafts 47 and 48 and sidewise movement of the outermost pulleys 53, stop collars on the shafts 47 and 48 or other suitable means may be provided. Of the right hand series of pulleys 53 the first pulley, adjacent to the sprocket wheel 49 is fixed on the shaft 47 and the next adjacent pulley thereto is loose thereon, and so on throughout the series; of the left hand series of pulleys 53 the first pulley, adjacent to the sprocket wheel 51, is loose and the next adjacent pulley thereto is fixed on the shaft 48, and so on throughout this series. It will thus be noted that the fixed pulleys on either shaft are in opposed relation to a loose pulley on the other shaft.

Each pair of oppositely related pulleys is provided with a belt 54 which passes over the bed 13, and travelling between the side limits of the ribs or guide strips 14 passes under the bed 13, the belts of each series of pulleys being spaced apart adjacent to the pulleys of the series of rolls 55 and 56, supported by the exterior end pieces 15 at the respective ends of the frame of the table.

The longitudinal ribs or guide strips 14 are substantially of the same length but do not extend the full length of the bed 13, and are arranged on the bed 13 so that the ends of the ribs are staggered. One end of each rib is cut away or scarfed for attachment thereto of the turning members or turning bows 57, shown in Figs. 1 and 5. In the present instance there are two series of turning members or bows, four such members or bows in each series. Each of these members is a bowed piece of metal supported in edgewise position, the arrangement being of one turning member or bow in conjunction with three adjacently longitudinal ribs 14 and two belts 54 which are adjacent to each other. With the exception of the outermost turning members or bows, adjacent ends of each of two turning members or bows are secured for support to the scarfed ends of the outer of three adjacent longitudinal ribs; in the case of the outermost turning members or bows one end thereof is secured to the outermost longitudinal ribs and the other end is secured, with the adjacent end of the adjacent turning member or bow, to the longitudinal ribs which are third inwardly from the edge of the frame. In height the turning members or bows are arranged to contact with the containers or other articles carried onward by the belts 54, clearance being provided at the lower edges of the turning members or bows for passage of the belts thereunder. For maintaining the turning members or bows at their concave or bowed portions or backs, a plate such as 58 is secured to the bed 13 at one end of the intermediate rib 14 of each of the three ribs with which the turning members or bows are used in conjunction, the plate 58 having secured thereto the upstanding or vertical bracket or brace 59 against which the concave or bowed portion of the turning member or bow bears. The planes of the upper surfaces of the plates 58 are the same as or are slightly below the upper surfaces of the belts 54, for obviating interference of the plates with the moving articles.

Movement of the containers or other articles from one belt 54 to an adjacent belt is permitted by the passages 60 formed between the ends of the longitudinal ribs or guide strips 14 and the concave or bow portions of the turning members or turning bows 57.

For placing containers or other articles on the outermost belt 54 at the point of reception for onward movement, the trough 61 is provided, being supported by an extension 62 of one of the brackets 45, the trough 61 as shown being in conjunction with the rotatable filler table 63 of a filling machine. The bottom of the trough 61 is substantially on the same plane as the upper surface of the adjacent outermost belt 54 so that a container or other article will pass readily from the trough to the belt under impulse from the rotating filler table 63. The trough 61 has receiving fingers 64 and 65 extending over the filler table, the finger 64 being shorter than the finger 65 and preferably having an outwardly curving end for engaging the container or other article.

The trough 61 however is not essential to the invention as when the invention is not used in association with a filler table the containers or other articles may be placed manually on the outermost belt 54 at the point of reception for onward movement.

In operation: The containers or other articles are placed on the outermost belt 54 at the point of reception of the table either manually, or preferably by impulse as from the filler table 62, and are carried along by this belt until the container or other article is brought into contact with the first of the turning members or turning bows 57, and is caused thereby to cross over through the first of the passages 60 onto the next adjacent belt 54. The container or other article is then carried onward by this belt in direction reverse to the first direction of travel until it comes into contact with a second of the turning members or turning bows 57 by which it is caused to cross over through a second of the passages 60 onto the next adjacent belt by which it is carried onward in the first direction of travel, this operation being repeated until the container or other article reaches the point of withdrawal. And as readily will be seen a chain of contiguous containers or other articles may be maintained from the point of reception to the point of withdrawal. The containers in passing from the point of reception to the point of withdrawal travel over a long extent of space, thus if the length of travel of the container or other article on each belt is about nine feet, there being nine such belts, the containers or other articles will travel in all about eighty-one feet, and at a speed which may be regulated by any well known means, not shown, used in connection with the motor or driving mechanism, by which the time of travel may be such as required for the purposes of permitting temperature or chemical changes, or settling in the contents of the containers, or for drying or other purposes connected with the other articles, the containers upon reaching the point of withdrawal, being in condition for capping and the other articles in condition for wrapping or packing, and having been moved from a prior condition and position to another condition and position without disturbance or handling and without expenditure of labor, the new position if desired being convenient to means for capping or wrapping or packing. Thus the term articles includes containers or the like, as the purpose for moving the articles, containers or the like, in a convenient continuous endless-chainlike manner from one position to another desired position is the same; and moreover, the purpose to permit inherent change of condition of the articles or of the contents of the containers or the like while the articles, containers or the like are moved in this manner from one position to another desired position is the same.

Having thus described my invention, it should be understood that there may be modifications thereof and variations therein without departing from the spirit of the invention or exceeding the scope of the appended claims.

What I claim and desire to protect by Letters Patent is:—

1. In a settling table of the character described, in combination with means for distributing articles by impulse imparted to the articles by said means, a table having an end for receiving the articles for movement; a series of oppositely moving parallel belts; means for moving the belts; means for transferring the articles from a belt to an adjacent oppositely moving belt; and means located on said table at the end for receiving the articles and adjacent to one of said belts and having oppositely related extending portions for receiving therebetween the articles while they are under impulse from said distributing means and transporting the articles to said adjacent belt for movement thereby and transference to an adjacent oppositely moving belt.

2. In a settling table of the character described, in combination with rotary means for distributing articles by impulse imparted to the articles by said means, a table having an end for receiving the articles for movement; a series of oppositely moving parallel belts; means for moving the belts; means for transferring articles from a belt to an adjacent oppositely moving belt; and means located on said table at the end for receiving the articles and having oppositely related extending portions cooperating with said rotary distributing means adjacent to one of said belts for receiving therebetween the articles while they are under impulse from said distributing means and transporting the articles to said adjacent belt for movement thereby and transference to an oppositely moving belt.

3. In a settling table of the character described, in combination with means for distributing articles by impulse imparted to the articles by said means, a table having an end for receiving the articles for movement; a series of oppositely moving parallel belts; means for moving the belts; means for transferring articles from a belt to an adjacent oppositely moving belt; and a trough located on said table at the end for receiving the articles and adjacent to one of said belts above the plane of said distributing means and having oppositely disposed fingers for receiving the articles therebetween while they are under impulse from said distributing means and transporting the articles to said adjacent belt for movement thereby and transferrence to an oppositely moving belt.

4. In combination, an elongate table; adjacent parallel belts moving in opposite directions longitudinally of the table; guide ribs of uniform construction secured to the table longitudinally thereof and spaced equidistantly apart, a guide rib being arranged between adjacent belts and a guide rib on each of the outer sides of the adjacent belts; bow members arranged transversely of the table near the ends thereof and positioned above the belts and in width extending over adjacent end portions of adjacent belts, the free ends of the bow members being secured to the adjacent ends of the outer guide ribs, the ends of the intermediate guide ribs being spaced away from the back portions of the bow members for providing passageways for articles from one belt to an adjacent belt when the articles are moved by the belts.

5. In combination, an elongate horizontally disposed table; adjacent parallel belts movable in opposite directions longitudinally of the table; guide ribs of uniform construction secured to the table longitudinally thereof and spaced equidistantly apart, a guide rib being arranged between adjacent belts and a guide rib on each of the outer sides of the adjacent belts; bow members arranged transversely of the table near the ends thereof and positioned above the belts and in width extending over end portions of adjacent belts, the free ends of the bow members being secured to the adjacent ends of the outer guide ribs, the ends of the intermediate guide ribs being spaced away from the back portion of the bow members for providing passageways for articles from one belt to an adjacent belt; and plates secured to the table longitudinally thereof in said passageways and permitting passage of articles over the plates and having at their outer ends upstanding brackets provided with cross-pieces bearing against the back portions of the bow members for supporting the bow members.

6. In combination, an elongate horizontally disposed table; guide ribs of uniform construction secured to the table longitudinally thereof and spaced equidistantly apart; adjacent parallel belts movable in opposite directions between the guide ribs the belts being of slightly less width than the width of the space between the guide ribs for providing article supporting surfaces of substantially the width of said space, a guide being arranged between adjacent belts and a guide rib on each of the outer sides of the adjacent belts; bow members arranged transversely of the table near the ends thereof and positioned above the belts and in width extending over end portions of adjacent belts, the free ends of the bow members being secured to the adjacent ends of the outer guide ribs, the ends of the intermediate guide ribs being spaced away from the back portions of the bow members for providing passageways for articles from one belt to an adjacent belt; and plates secured to the table longitudinally thereof in said passageways and permitting passage of articles over the plates and having at their outer ends upstanding brackets provided with cross-pieces bearing against the back portions of the bow members for supporting the bow members.

EDWARD KALLENBACH.

Witnesses:
CHAS. S. WILLIAMS,
H. D. PENNEY.